Long & Lownsbery
Water Filter.

Nº 81,386            Patented Aug. 25, 1868.

Witnesses:
A. T. McMaster
W. J. Creelman

Inventor
Wm. C. Long.
N. A. Lownsbery,
By J. Fraser & Co
Atty.

United States Patent Office.

WILLIAM C. LONG AND HARVEY A. LOWNSBERY, OF LOCKPORT, NEW YORK.

Letters Patent No. 81,386, dated August 25, 1868.

IMPROVED FILTER.

The Schedule referred to in these Letters Patent and making part of the same.

TO ALL WHOM IT MAY CONCERN:

Be it known that we, WILLIAM C. LONG and HARVEY A. LOWNSBERY, of Lockport, in the county of Niagara, and State of New York, have invented a certain new and useful Improvement in Submerged Filters; and we do hereby declare that the following is a full and exact description thereof, reference being had to the accompanying drawings, making part of this specification.

Figure 1:
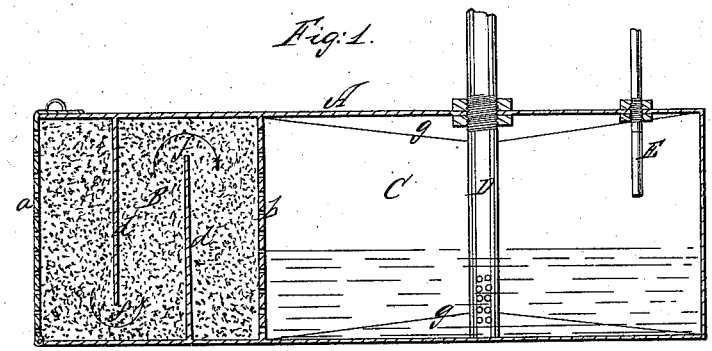

Figure 1 is a longitudinal section of our improved filter.

Figure 2:
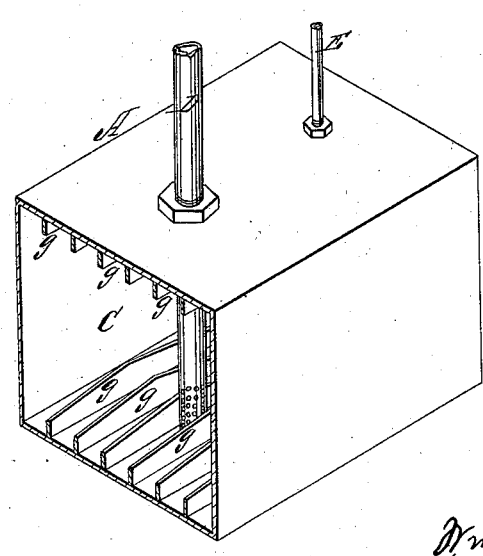

Figure 2, a cross-section, showing the filter in perspective.

Like letters of reference indicate corresponding parts in both figures.

Our invention consists in combining, with a submerged filter made of galvanized iron, two or more cross-diaphragms, giving a zigzag passage of the water through the filtering-media, and longitudinal ribs in the water-chamber, which serve to stiffen and stay the filter as it is handled by the pipe.

In the drawings, A indicates the filter, which is made of rectangular or square form, and of galvanized iron, which prevents oxidation and tainting of the water.

This filter is divided, by perforated partition $b$, into two compartments, B C, the first forming the filtering-chamber, (being filled with packing for the purpose,) and the last forming the reservoir or supply-chamber, for holding the purified water.

The water is admitted from the outside, through the perforated plates $a\ b$, passing through the packing, and it is drawn from the reservoir by water-pipe D, extending through to near the bottom, and attached in any suitable manner.

A small pipe, E, allows free passage of the air.

In the packing-chamber, we locate two or more diaphragms, $d\ d$, at suitable distances apart, leaving passages $f\ f$, which alternate in position, as shown. The object of this is to give a zigzag or indirect current of the water through the filtering-media, thereby not only producing a better effect by the long passage, but, by a direction that is vertical, affording a better chance for the deposition of the particles of impure matter. By this means, the filtering-media may be made comparatively thin, and the whole surface of the plates $a\ b$ may be filled with holes.

The interior of the water-chamber is provided at top and bottom with longitudinal ribs $g\ g$, at suitable distance apart, as clearly shown, the purpose of which is to strengthen the box at the points where the greatest strain comes in handling the filter by the water-pipe. This effectually prevents any bulging action, and also obviates collapse from compression of the water. If desirable, the sides and ends may be arranged in a similar manner.

This filter, constructed of galvanized iron, and thus arranged, can be easily handled, and inserted at any desired depth under water, and a pure article drawn therefrom.

What we claim as our invention, and desire to secure by Letters Patent, is—

The arrangement, in connection with the galvanized-iron filter A, of the diaphragms $a\ b$, dividing the packing-chamber, and the ribs $g\ g$, strengthening the water-chamber, the whole operating in the manner and for the purpose specified.

In witness whereof, we have hereunto signed our names in the presence of two subscribing witnesses.

WM. C. LONG,
HARVEY A. LOWNSBERY.

Witnesses:
T. A. GASSAWAY,
WILLIAM ARCHER.